(12) United States Patent
Katrak et al.

(10) Patent No.: US 10,170,259 B2
(45) Date of Patent: Jan. 1, 2019

(54) SYSTEM FOR CONTROLLING OPERATION OF A CONTACTOR USING A HIGH SIDE SENSE CIRCUIT AND A LOW SIDE SENSE CIRCUIT

(71) Applicant: LG Chem, Ltd., Seoul (KR)

(72) Inventors: Kerfegar K. Katrak, Fenton, MI (US); Kunal Tipnis, Troy, MI (US)

(73) Assignee: LG Chem, Ltd., Seoul (KR)

( * ) Notice: Subject to any disclaimer, the term of this patent is extended or adjusted under 35 U.S.C. 154(b) by 255 days.

(21) Appl. No.: 15/230,767

(22) Filed: Aug. 8, 2016

(65) Prior Publication Data
US 2017/0365430 A1    Dec. 21, 2017

Related U.S. Application Data

(60) Provisional application No. 62/352,302, filed on Jun. 20, 2016.

(51) Int. Cl.
| | | |
|---|---|---|
| *H01H 47/02* | (2006.01) | |
| *H01H 47/32* | (2006.01) | |
| *B60R 16/03* | (2006.01) | |
| *H01F 7/18* | (2006.01) | |
| *F02N 11/08* | (2006.01) | |
| *H01M 10/44* | (2006.01) | |
| *H02J 7/00* | (2006.01) | |

(52) U.S. Cl.
CPC ............ *H01H 47/32* (2013.01); *B60R 16/03* (2013.01); *F02N 11/087* (2013.01); *H01F 7/1844* (2013.01); *H01F 2007/1888* (2013.01); *H01H 47/02* (2013.01); *H01M 10/44* (2013.01); *H02J 7/0031* (2013.01)

(58) Field of Classification Search
USPC .......................................... 361/139, 160, 170
See application file for complete search history.

(56) References Cited

U.S. PATENT DOCUMENTS

| | | |
|---|---|---|
| 8,792,222 B2 | 7/2014 | Grupido |
| 8,861,161 B2 | 10/2014 | Grupido |
| 8,901,934 B2 | 12/2014 | Namou et al. |
| 8,994,210 B2 | 3/2015 | Basheer |
| 9,024,468 B2 | 5/2015 | Basheer |
| 9,050,893 B2 | 6/2015 | Grupido |
| 9,162,579 B2 | 10/2015 | Grupido |
| 2005/0236900 A1* | 10/2005 | Kahara .................. F02N 11/087 307/10.1 |
| 2012/0105065 A1* | 5/2012 | Namou .............. G01R 31/3275 324/415 |
| 2013/0009464 A1* | 1/2013 | Firehammer ....... H01M 10/425 307/9.1 |

* cited by examiner

*Primary Examiner* — Danny Nguyen
(74) *Attorney, Agent, or Firm* — Buckert Patent & Trademark Law Firm PC; John F. Buckert

(57) ABSTRACT

A system for controlling operation of a contactor is provided. The system stops outputting a control signal to open the contactor, and then measures a low side sense signal from a low side sense circuit electrically coupled to a low side end of a contactor coil, or a high side sense signal from a high side sense circuit that is electrically coupled to a high side end of the contactor coil, to determine whether the contactor has a closed operational position, and if not, the system stops outputting another control signal to open the contactor.

12 Claims, 3 Drawing Sheets

SYSTEM FOR CONTROLLING OPERATION OF A CONTACTOR USING A HIGH SIDE SENSE CIRCUIT AND A LOW SIDE SENSE CIRCUIT

CROSS-REFERENCE TO RELATED APPLICATIONS

This application claims priority to U.S. Provisional Patent Application No. 62/352,302 filed on Jun. 20, 2016, the entire contents of which are hereby incorporated by reference herein.

BACKGROUND

The inventors herein have recognized a need for an improved system for controlling operation of a contactor. The system provides a technical effect of utilizing diagnostic diversity for opening a contactor. In particular, the system stops outputting a control signal to open the contactor, and then measures a low side sense signal from a low side sense circuit electrically coupled to a low side end of a contactor coil, or a high side sense signal from a high side sense circuit that is electrically coupled to a high side end of the contactor coil, to determine whether the contactor has a closed operational position, and if not, the system stops outputting another control signal to open the contactor.

SUMMARY

A system for controlling operation of a contactor in accordance with an exemplary embodiment is provided. The contactor includes a contactor coil and a contact. The system includes a microcontroller having first and second analog-to-digital converters and first and second output ports. The first output port controls whether a low side end of the contactor coil is electrically coupled to electrical ground. The second output port controls whether a high side end of the contactor coil receives an energization voltage. The system further includes a low side sense line that is electrically coupled to and between the low side end of the contactor coil and a low side sense circuit. The low side sense circuit is further electrically coupled to the first analog-to-digital converter. The system further includes a high side sense line that is electrically coupled to and between the high side end of the contactor coil and a high side sense circuit. The high side sense circuit is further electrically coupled to the second analog-to-digital converter. The microcontroller is programmed to receive a command message to open the contact of the contactor, from an external controller. The microcontroller is further programmed to stop generating a first control signal on the first output port to de-energize the contactor coil to open the contact of the contactor, in response to the command message from the external controller. The low side sense circuit receives a first signal from the low side sense line and outputs a low side sense signal corresponding to the first signal. The first analog-to-digital converter receives the low side sense signal and outputs a low side sense value corresponding to the low side sense signal. The microcontroller is further programmed to stop generating a second control signal on the second output port to de-energize the contactor coil to open the contact of the contactor, if the low side sense value is greater than a first threshold voltage value.

A system for controlling operation of a contactor in accordance with another exemplary embodiment is provided. The contactor has a contactor coil and a contact. The system includes a microcontroller having first and second analog-to-digital converters and first and second output ports. The first output port controls whether a low side end of the contactor coil is electrically coupled to electrical ground. The second output port controls whether a high side end of the contactor coil receives an energization voltage. The system further includes a low side sense line that is electrically coupled to and between the low side end of the contactor coil and a low side sense circuit. The low side sense circuit is further electrically coupled to the first analog-to-digital converter. The system further includes a high side sense line that is electrically coupled to and between the high side end of the contactor coil and a high side sense circuit. The high side sense circuit is further electrically coupled to the second analog-to-digital converter. The microcontroller is programmed to receive a command message to open the contact of the contactor, from an external controller. The microcontroller is further programmed to stop generating a second control signal on the second output port to de-energize the contactor coil to open the contact of the contactor, in response to the command message from the external controller. The high side sense circuit receives a first signal from the high side sense line and outputs a high side sense signal corresponding to the first signal. The second analog-to-digital converter receives the high side sense signal and outputs a high side sense value corresponding to the high side sense signal. The microcontroller is further programmed to stop generating a first control signal on the first output port to de-energize the contactor coil to open the contact of the contactor, if the high side sense value is greater than a first threshold voltage value.

DETAILED DESCRIPTION

Figure 1:
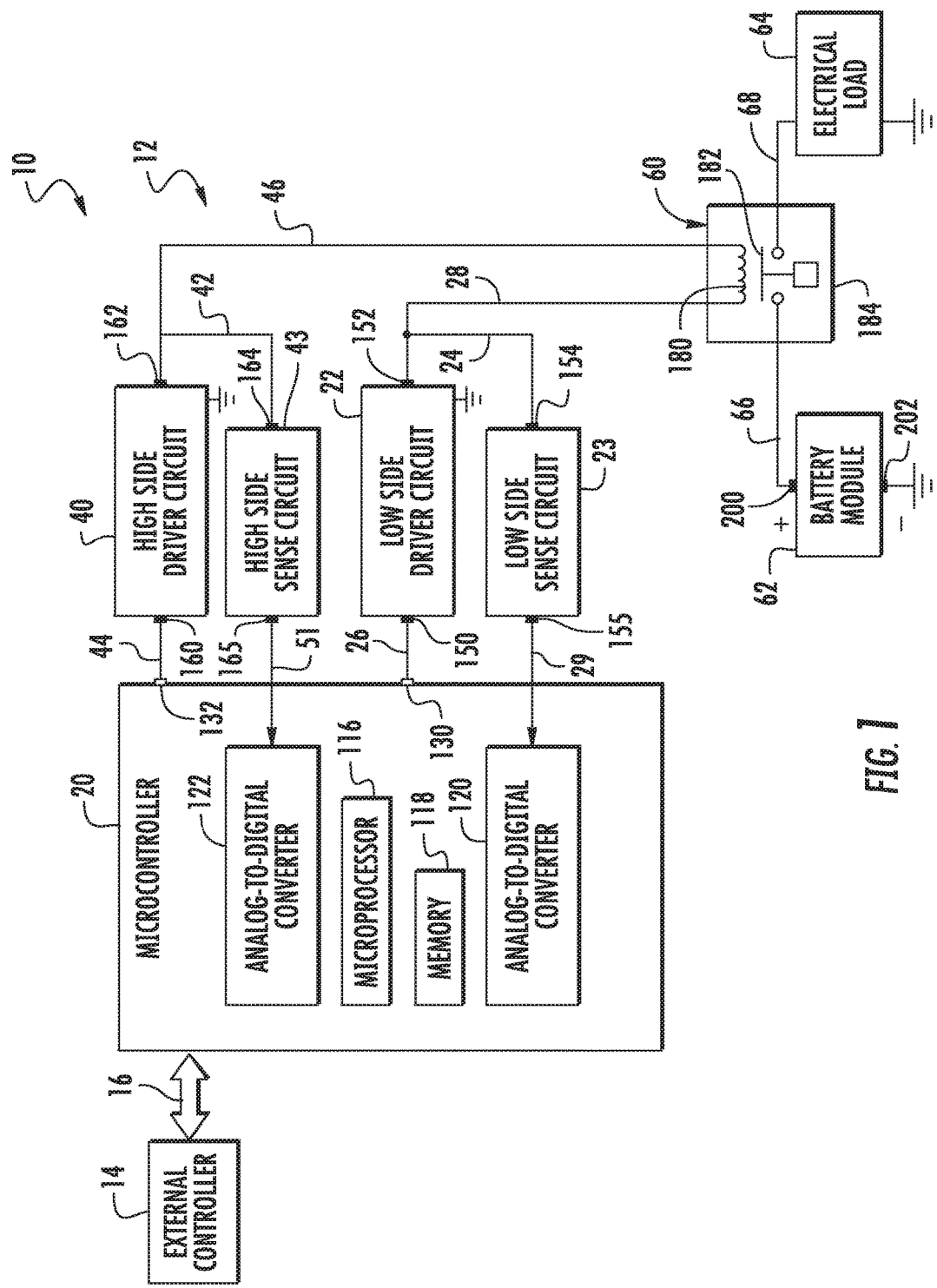
FIG. 1 is a schematic of a vehicle having a system for controlling operation of a contactor in accordance with an exemplary embodiment, an external controller, and a communication bus.

Referring to FIG. 1, a vehicle 10 includes a system 12 for controlling operation of a contactor 60, an external controller 14, and a communication bus 16. An advantage of the system 12 is that the system 12 utilizes diagnostic diversity for opening the contactor 60. In particular, the system 12 stops outputting a control signal to open the contactor 60, and then measures a low side sense signal from a low side sense circuit 23 electrically coupled to a low side end of a contactor coil 182, or a high side sense signal from a high side sense circuit 40 that is electrically coupled to a high side end of the contactor coil 182, to determine whether the contactor 60 has a closed operational position, and if not, the system 12 stops outputting another control signal to open the contactor 60.

For purposes of understanding, the term "first and second analog-to-digital converters" refers to first and second banks of analog-to-digital converter channels.

The system 12 includes a microcontroller 20, a low side driver circuit 22, a low side sense line 24, a low side sense circuit 23, electrical lines 26, 28, 29, a high side driver circuit 40, a high side sense line 42, a high side sense circuit 43, electrical lines 44, 46, 51, a contactor 60, a battery module 62, an electrical load 64, electrical lines 66, 68.

The microcontroller 20 includes a microprocessor 116, a memory 118, analog-to-digital converters 120, 122, and first and second output ports 130, 132. The microcontroller 20 is programmed to perform diagnostic steps (described in flowcharts herein) utilizing the microprocessor 116 which executes software instructions stored in the memory 118. The microprocessor 116 operably communicates with the memory 118, the analog-to-digital converters 120, 122, and the first and second output ports 130, 132. The first output port 130 controls whether a low side end of the contactor coil 180 is electrically coupled to electrical ground. The second output port 132 controls whether a high side end of the contactor coil 180 receives an energization voltage.

The low side driver circuit 22 has an input node 150 and an output node 152. The input node 150 is electrically coupled to the first output port 130 of the microcontroller 20 utilizing the electrical line 26. The output node 152 is electrically coupled to a low side end of the contactor coil 180 utilizing the electrical line 28. When the low side driver circuit 22 receives a first control signal from the first output port 130 of the microcontroller 20, the low side driver circuit 22 electrically couples the low side end of the contactor coil 180 to electrical ground. When the low side driver circuit 22 does not receive the first control signal from the first output port 130 of the microcontroller 20, the low side driver circuit 22 electrically de-couples the low side end of the contactor coil 180 from electrical ground.

The low side sense line 24 is electrically coupled to and between the low side end of the contactor coil 180 and the input node 154 of the low side sense circuit 23.

The low side sense circuit 23 is provided to receive a first signal from the low side sense line 24 and to output a low side sense signal corresponding to the first signal to the analog-to-digital converter 120. The low side sense circuit 23 includes an input node 154 and an output node 155. The input node 154 is electrically coupled to the low side sense line 24. The output node 155 is electrically coupled to the analog-to-digital converter 120 utilizing the electrical line 29. The first signal from the low side sense line 24 can either be an electrical current or a voltage. Further, the low side sense signal from the low side sense circuit 23 can either be an electrical current or a voltage.

The high side driver circuit 40 has an input node 160 and an output node 162. The input node 160 is electrically coupled to the second output port 132 of the microcontroller 20 utilizing the electrical line 44. The output node 162 is electrically coupled to a high side end of the contactor coil 180 utilizing the electrical line 46. When the high side driver circuit 40 receives a second control signal from the second output port 132 of the microcontroller 20, the high side driver circuit 40 supplies an energization voltage to the high side end of the contactor coil 180. When the high side driver circuit 40 does not receive the second control signal from the second output port 132 of the microcontroller 20, the high side driver circuit 40 does not supply the energization voltage to the high side end of the contactor coil 180.

The high side sense line 42 is electrically coupled to and between the high side end of the contactor coil 180 and the input node 164 of the high side sense circuit 43.

The high side sense circuit 43 is provided to receive a second signal from the high side sense line 42 and to output a high side sense signal corresponding to the second signal to the analog-to-digital converter 122. The high side sense circuit 43 includes an input node 164 and an output node 165. The input node 164 is electrically coupled to the high side sense line 42. The output node 165 is electrically coupled to the analog-to-digital converter 122 utilizing the electrical line 51. The second signal from the high side sense line 42 can either be an electrical current or a voltage. Further, the high side sense signal from the high side sense circuit 43 can either be an electrical current or a voltage.

The contactor 60 is electrically coupled in series between a positive terminal 200 of the battery module 62 and the electrical load 64. The contactor 60 includes the contactor coil 180, a contact 182, and a housing 184. The housing 184 holds the contactor coil 180 and the contact 182 therein. When the microcontroller 20 generates first and second control signals on the output ports 130, 132, respectively that are received by the low side driver circuit 22 and the high side driver circuit 40, respectively, the driver circuits 22, 40 energize the contactor coil 180, which moves the contact 182 to a closed operational position if the contactor 60 is operating as desired. Alternately, when the microcontroller 20 stops generating the first and second control signals, the driver circuits 22, 40 de-energize the contactor coil 180, which moves the contact 182 to an open operational position if the contactor 60 is operating as desired.

The battery module 62 includes a positive terminal 200 and a negative terminal 202. The battery module 62 generates a voltage between the positive terminal 200 and the negative terminal 202. The positive terminal 200 is electrically coupled to a first end of the contact 182 utilizing an electrical line 66.

The electrical load 64 is electrically coupled to a second end of the contact 182 utilizing an electrical line 68.

The external controller 14 operably communicates with the microcontroller 20 utilizing a communication bus 16. The external controller 14 can send a command message to the microcontroller 20 requesting that the contactor 60 be transitioned to an open operational position such that an operational voltage from the battery module 62 is removed from the electrical load 64 to de-energize the electrical load 64.

Figure 2:
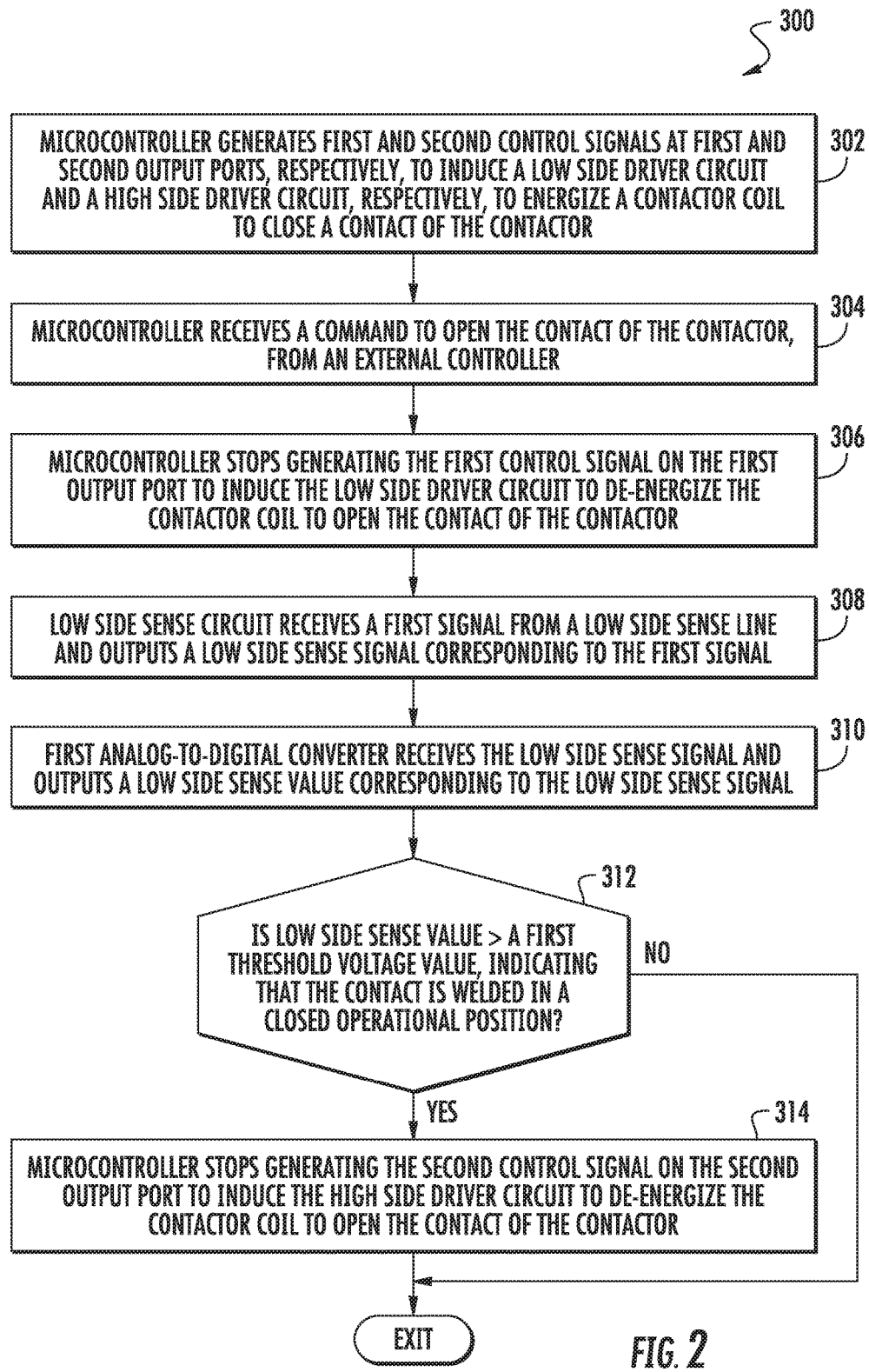
FIG. 2 is a flowchart of a first method for controlling operation of a contactor.

Referring to FIGS. 1 and 2, a flowchart of a first method 300 for controlling operation of the contactor 60 in accordance with another exemplary embodiment is provided.

At step 302, the microcontroller 20 generates first and second control signals at the first and second output ports 130, 132, respectively, to induce the low side driver circuit 22 and the high side driver circuit 40, respectively, to energize the contactor coil 180 to close the contact 182 of the contactor 60. After step 302, the method advances to step 304.

At step 304, the microcontroller 20 receives a command to open the contact 182 of the contactor 60, from the external controller 14. After step 304, the method advances to step 306.

At step 306, the microcontroller 20 stops generating the first control signal on the first output port to induce the low side driver circuit 22 to de-energize the contactor coil 180 to open the contact 182 of the contactor 60. After step 306, the method advances to step 308.

At step 308, the low side sense circuit 23 receives a first signal from a low side sense line 24 and outputs a low side sense signal corresponding to the first signal. In an exemplary embodiment, the low side sense signal has an amplitude or a frequency that is proportional to an amplitude or a frequency of the first signal. After step 308, the method advances to step 310.

At step 310, the first analog-to-digital converter 120 receives the low side sense signal and outputs a low side sense value corresponding to the low side sense signal. In an exemplary embodiment, the low side sense value has a magnitude that is proportional to an amplitude or a frequency of the low side sense signal. After step 310, the method advances to step 312.

At step 312, the microcontroller 20 makes a determination as to whether the low side sense value is greater than a first threshold voltage value, indicating that the contact is welded in a closed operational position. If the value of step 312 equals "yes", the method advances to step 314. Otherwise, the method is exited.

At step 314, the microcontroller 20 stops generating a second control signal on the second output port 132 to induce the high side driver circuit 40 to de-energize the contactor coil 180 to open the contact 182 of the contactor 60. After step 314, the method is exited.

Figure 3:
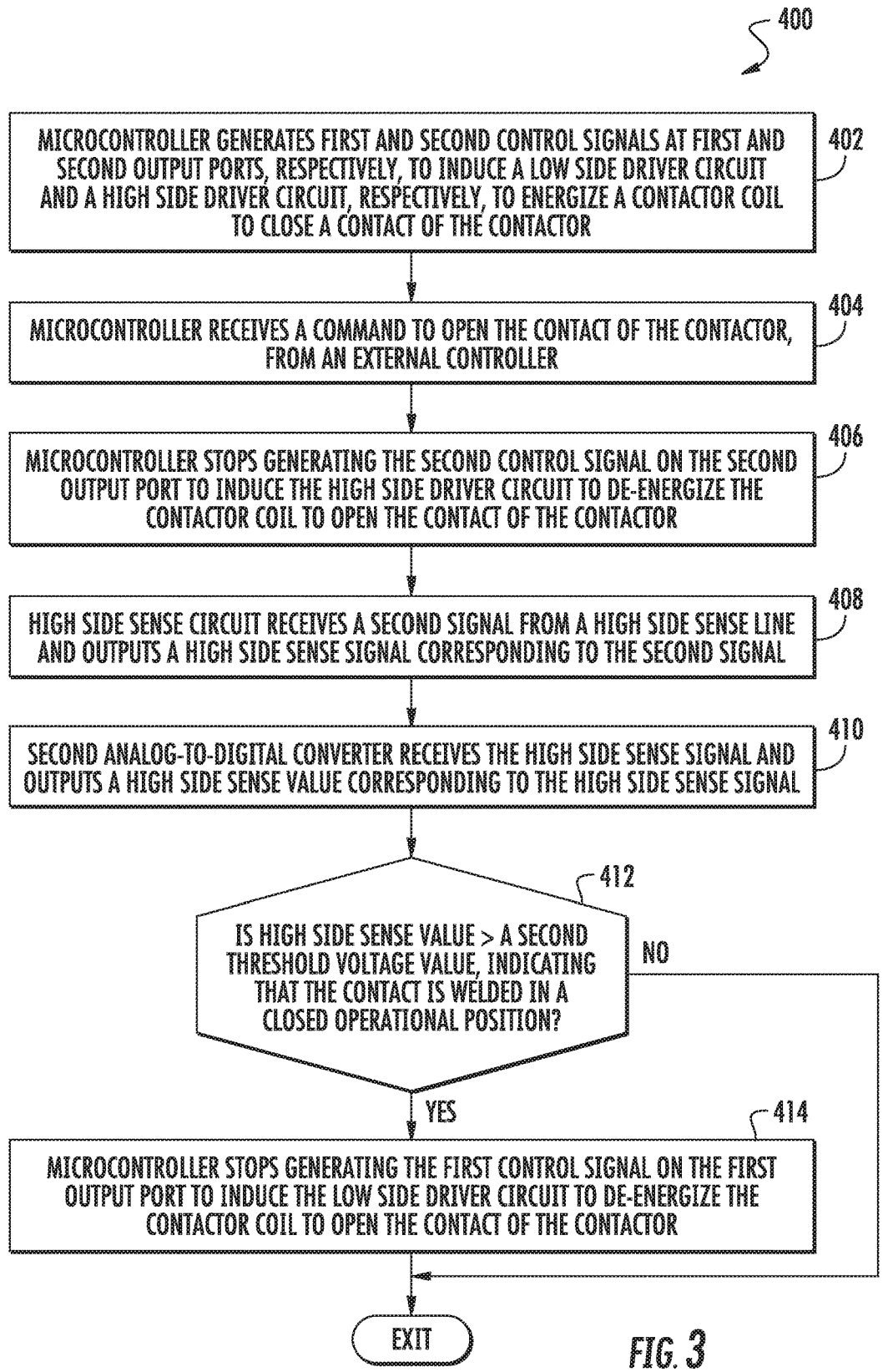
FIG. 3 is a flowchart of a second method for controlling operation of a contactor.

Referring to FIGS. 1 and 3, a flowchart of a second method 400 for controlling operation of the contactor 60 in accordance with another exemplary embodiment is provided.

At step 402, the microcontroller 20 generates first and second control signals at the first and second output ports 130, 132, respectively, to induce the low side driver circuit 22 and the high side driver circuit 40, respectively, to energize the contactor coil 180 to close the contact 182 of the contactor 60. After step 402, the method advances to step 404.

At step 404, the microcontroller 20 receives a command to open the contact 182 of the contactor 60, from the external controller 14. After step 404, the method advances to step 406.

At step 406, the microcontroller 20 stops generating the second control signal on the second output port 132 to induce the high side driver circuit 40 to de-energize the contactor coil 180 to open the contact 182 of the contactor 60. After step 406, the method advances to step 408.

At step 408, the high side sense circuit 43 receives a second signal from a high side sense line 42 and outputs a high side sense signal corresponding to the second signal. In an exemplary embodiment, the high side sense signal has an amplitude or a frequency that is proportional to an amplitude or a frequency of the second signal. After step 408, the method advances to step 410.

At step 410, the second analog-to-digital converter 122 receives the high side sense signal and outputs a high side sense value corresponding to the high side sense signal. In an exemplary embodiment, the high side sense value has a magnitude that is proportional to an amplitude or a frequency of the high side sense signal. After step 410, the method advances to step 412.

At step 412, the microcontroller 20 makes a determination as to whether the high side sense value is greater than a second threshold voltage value, indicating that the contact is welded in a closed operational position. If the value of step 412 equals "yes", the method advances to step 414. Otherwise, the method is exited.

At step 414, the microcontroller 20 stops generating a first control signal on the first output port 130 to induce the low side driver circuit 22 to de-energize the contactor coil 180 to open the contact 182 of the contactor 60. After step 414, the method is exited.

The system for controlling a contactor described herein provides a substantial advantage over other systems and methods. In particular, the system provides a technical effect of utilizing diagnostic diversity for opening a contactor. The system stops outputting a control signal to open the contactor, and then measures a low side sense signal from a low side sense circuit electrically coupled to a low side end of a contactor coil, or a high side sense signal from a high side sense circuit that is electrically coupled to a high side end of the contactor coil, to determine whether the contactor has a closed operational position, and if not, the system stops outputting another control signal to open the contactor.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A system for controlling operation of a contactor having a contactor coil and a contact, comprising:
a microcontroller having an analog-to-digital converter, and a first output port controlling whether a low side end of the contactor coil is electrically coupled to electrical ground, and a second output port controlling whether a high side end of the contactor coil receives an energization voltage;
a low side sense line being electrically coupled to the low side end and a low side sense circuit and the analog-to-digital converter;
the microcontroller stopping a generation of a first control signal on the first output port to electrically de-coupled the low side end of the contactor coil from the electrical ground;
the low side sense circuit receiving a first signal from the low side sense line and outputting a low side sense signal corresponding to the first signal;
the analog-to-digital converter receiving the low side sense signal and outputting a low side sense value corresponding to the low side sense signal; and
the microcontroller stopping a generation of a second control signal on the second output port to remove the energization voltage from the high side end of the contactor coil to move the contact to the open operational position in response to the low side sense value being greater than a first threshold voltage value indicating that the contact has a closed operational position after the microcontroller stopped generating the first control signal.

2. The system of claim 1, further comprising a low side driver circuit having an input node and an output node, the input node being electrically coupled to the first output port, the output node being electrically coupled to the low side end.

3. The system of claim 2, wherein the low side sense voltage sense line being electrically coupled to the output node and the low side sense circuit.

4. The system of claim 1, further comprising a high side driver circuit having an input node and an output node, the input node being electrically coupled to the second output port, the output node being electrically coupled to the high side end.

5. The system of claim 1, further comprising:
a battery module electrically coupled to a first end of the contact; and
an electrical load electrically coupled to a second end of the contact.

6. A system for controlling operation of a contactor having a contactor coil and a contact, comprising:
- a microcontroller having an analog-to-digital converter, and a first output port controlling whether a low side end of the contactor coil is electrically coupled to electrical ground, and a second output port controlling whether a high side end of the contactor coil receives an energization voltage;
- a high side sense line being electrically coupled to the high side end and a high side sense circuit and the analog-to-digital converter;
- the microcontroller stopping a generation of a first control signal on the second output port to remove the energization voltage from the high side end of the contactor coil to de-energize the contactor coil;
- the high side sense circuit receiving a first signal from the high side sense line and outputting a high side sense signal corresponding to the first signal;
- the analog-to-digital converter receiving the high side sense signal and outputting a high side sense value corresponding to the high side sense signal; and
- the microcontroller stopping a generation of a second control signal on the first output port to electrically de-couple the low side end of the contactor coil from the electrical ground to move the contact to the open operational position in response to the high side sense value being greater than a first threshold voltage value indicating that the contact has a closed operational position after the microcontroller stopped generating the first control signal.

7. The system of claim 6, further comprising a high side driver circuit having an input node and an output node, the input node being electrically coupled to the second output port, the output node being electrically coupled to the high side end.

8. The system of claim 7, wherein the high side voltage sense line being electrically coupled to the output node and the high side sense circuit.

9. The system of claim 7, further comprising:
- a battery module electrically coupled to a first end of the contact; and
- an electrical load electrically coupled to a second end of the contact.

10. The system of claim 1, wherein:
- the microcontroller receiving a command message to open the contact of the contactor, from an external controller; and
- the microcontroller stopping the generation of the first control signal on the first output port, in response to the command message.

11. The system of claim 6, wherein:
- the microcontroller receiving a command message to open the contact of the contactor, from an external controller; and
- the microcontroller stopping the generation of the first control signal on the second output port, in response to the command message.

12. A system for controlling operation of a contactor having a contactor coil and a contact, comprising:
- a microcontroller having an analog-to-digital converter and first and second output ports;
- a low side sense line being electrically coupled to the low side end and a low side sense circuit and the analog-to-digital converter;
- the microcontroller stopping a generation of a first control signal on the first output port to electrically de-couple the low side end of the contactor coil from electrical ground to de-energize the contactor coil;
- the low side sense circuit receiving a first signal from the low side sense line and outputting a low side sense signal corresponding to the first signal;
- the analog-to-digital converter receiving the low side sense signal and outputting a low side sense value corresponding to the low side sense signal; and
- the microcontroller stopping a generation of a second control signal on the second output port to remove the energization voltage from the high side end of the contactor coil to move the contact to the open operational position in response to the low side sense value being greater than a first threshold voltage value after the microcontroller stopped generating the first control signal.

* * * * *